United States Patent
Gordon Petersen et al.

(10) Patent No.: US 8,972,056 B2
(45) Date of Patent: Mar. 3, 2015

(54) METHOD OF FINDING FEASIBLE JOINT TRAJECTORIES FOR AN N-DOF ROBOT WITH ROTATION INVARIANT PROCESS (N>5)

(75) Inventors: Henrik Gordon Petersen, Odense NV (DK); Jens Cortsen, Aarslev (DK); Dorthe Soelvason, Odense SO (DK)

(73) Assignee: SYDDANSK Universitet, Odense M (DK)

( * ) Notice: Subject to any disclaimer, the term of this patent is extended or adjusted under 35 U.S.C. 154(b) by 264 days.

(21) Appl. No.: 13/521,594

(22) PCT Filed: Jan. 7, 2011

(86) PCT No.: PCT/EP2011/050145
§ 371 (c)(1),
(2), (4) Date: Sep. 19, 2012

(87) PCT Pub. No.: WO2011/086032
PCT Pub. Date: Jul. 21, 2011

(65) Prior Publication Data
US 2013/0013110 A1    Jan. 10, 2013

Related U.S. Application Data

(60) Provisional application No. 61/294,852, filed on Jan. 14, 2010.

(30) Foreign Application Priority Data

Jan. 14, 2010    (EP) ..................... 10150782

(51) Int. Cl.
G05B 19/04    (2006.01)
B25J 9/16    (2006.01)
G05B 19/18    (2006.01)

(52) U.S. Cl.
CPC ..... B25J 9/1664 (2013.01); *G05B 2219/40381* (2013.01)
USPC .......................................... 700/255; 700/250

(58) Field of Classification Search
USPC .......................................................... 700/255
See application file for complete search history.

(56) References Cited

U.S. PATENT DOCUMENTS

| 5,544,282 A | 8/1996 | Chen et al. |
| 6,037,733 A | 3/2000 | Genov et al. |

(Continued)

FOREIGN PATENT DOCUMENTS

| WO | WO 92/22024 | 12/1992 |
| WO | WO 02/04175 | 1/2002 |

OTHER PUBLICATIONS

Hemmerle et al. "Optimal Path Placement for Kinematically Redundant Manipulators", Proceedings of the International Conference on Robotics and Automation, Los Alamitos, *IEEE Comp. Soc. Press*, U.S., vol. Conf. 7, 1991, pp. 1234-1244.

(Continued)

*Primary Examiner* — Ian Jen
(74) *Attorney, Agent, or Firm* — Merchant & Gould P.C.

(57) ABSTRACT

There is provided a computer-implemented method for determining feasible joint trajectories for an n-dof (n>5) robot in a rotation invariant processing of an object, such as milling, painting, and welding. The method includes the steps of receiving geometric data representing the object; receiving geometric data representing the processing tool; receiving a tool path X(t), where t is time; searching for feasible paths $q_{Robot}$ (t) using IK (t) and $q_{Tool}$ (t) as set of possible solutions at time t, wherein $q_{Robot}$ (t) defines positions of all the joints in the robot as function of time, $q_{Tool}$ (t) defines the rotation of a tool flange around the tool axis at time t, and IK (t) defines the inverse kinematics solutions for a given X(t) and $q_{Tool}$ (t); and determining, from the geometric data and X(t), how the joint path $q_{Robot}$ (t) should be chosen so as to comply with one or more optimisation criteria.

11 Claims, 2 Drawing Sheets

(56) References Cited

U.S. PATENT DOCUMENTS

| | | | |
|---|---|---|---|
| 6,292,715 B1* | 9/2001 | Rongo | 700/249 |
| 6,317,651 B1* | 11/2001 | Gerstenberger et al. | 700/245 |
| 6,463,358 B1 | 10/2002 | Watanabe et al. | |
| 6,822,412 B1* | 11/2004 | Gan et al. | 318/568.19 |
| 7,298,385 B2* | 11/2007 | Kazi et al. | 345/633 |
| 7,366,585 B2* | 4/2008 | Schnoor et al. | 700/213 |
| 2003/0171847 A1 | 9/2003 | Cheng et al. | |
| 2005/0246062 A1 | 11/2005 | Keibel | |
| 2009/0076655 A1* | 3/2009 | Blondel et al. | 700/254 |
| 2009/0259412 A1* | 10/2009 | Brogardh | 702/41 |
| 2010/0049352 A1* | 2/2010 | Kohlmaier et al. | 700/103 |
| 2010/0312389 A1* | 12/2010 | Weiss et al. | 700/252 |

OTHER PUBLICATIONS

International Search Report from International Application No. PCT/EP2011/050145 mailed Mar. 3, 2011.

Pashkevich et al., "Computer-aided programming of robotic manufacturing cells for laser cutting applications", *Emerging Technologies and Factory Automation*, 2001, pp. 603-612.

* cited by examiner

METHOD OF FINDING FEASIBLE JOINT TRAJECTORIES FOR AN N-DOF ROBOT WITH ROTATION INVARIANT PROCESS (N>5)

This application is a National Stage Application of PCT/EP2011/050145, filed 7 Jan. 2011, which claims benefit of Ser. No. 61/294,852, filed 14 Jan. 2010 in the U.S and Ser. No. 10150782.0, filed 14 Jan. 2010 in Europe and which applications are incorporated herein by reference. To the extent appropriate, a claim of priority is made to each of the above disclosed applications.

FIELD OF THE INVENTION

The present invention relates to a method of determining a course of relative motion between an object and a robot for interacting with the object. In particular, the invention relates to a method of finding feasible joint trajectories for a n-dof robot with a rotation invariant process (n>5). The method uses invariance with respect to rotation around the tool axis to ease the motion planning and thereby maximize the workspace of the robot.

BACKGROUND OF THE INVENTION

WO0204175A1 discloses the generation of instructions for a robot that is adapted to process an object. In accordance with the method described in the application control parameters are generated based on data of the object, the control parameters being associated with the orientation of the processing device during the processing of the object and being generated for a plurality of locations on the object so that each of the locations is assigned with at least one control parameter.

WO9222024A1 discloses a multi-axis computer numerically controlled (CNC) machine tool in which a cutting tool is movable relative to a workpiece by means of a number of linear and rotary joints under the control of a programmable control unit. The machine is programmed with a plurality of principal programmable axes, called "hard" axes, and with at least one synthesized additional programmable axis or "soft" axis which enables the cutting tool to be moved linearly in the direction of the soft axis without requiring a specific joint for that purpose. The synthesized "soft" axis is a non-collinear, partially redundant axis which increases the number of programmable degrees of freedom to a greater number than the machine degrees of freedom i.e.: the number of non-collinear joints. The principle of synthesizing "soft" axes may be extended to CNC machine tools having four or more principal hard axes, for instance, to produce a 5-joint CNC machine tool which has the flexibility of a conventional 7- or 8-joint machine tool.

U.S. Pat. No. 6,463,358 discloses a robot controller capable of finding a mistaught path and avoiding dangers involved in a real motion of a robot without using an off-line simulation system. An operation program for confirming safety is played back with the robot control system arranged such that a simulation function is on, a real motion is off, and comparison processing is on.

U.S. Pat. No. 6,037,733 concerns an improvement in a robotic arm structure which includes at least two links. Socalled θ motion is provided about a primary axis at the proximal end portion of the proximalmost of the links. Socalled R motion proceeds radially from the primary axis whereby the distal end portion of the distalmost of the links can be moved in a radially extending straight line. An end effector is pivotally mounted for rotation relative to the distal end portion of the distalmost link about an end effector axis which is parallel to the primary axis. The structure is improved by adding one or more a yaw motor, a roll motor and a pitch motor for rotating the wrist of the arm about the respective axes. A sensor array senses the R, θ, Z and yaw, roll and/or pitch motions and creates and transmits electronic signals representative thereof to a computer controller which monitors and controls the R, θ, Z and yaw, roll and/or pitch motions.

Due to deadlock problems associated with a "look ahead" method, such as that disclosed in US 2005/246062A1, where the path is found iteratively from one end and only the next or the next few time steps are considered, it is an object of the present invention to provide an approach where the search is performed in a more global manner; hereinafter referred to as a "globally in time" search.

SUMMARY OF THE INVENTION

According to the present invention there is provided a method, which allows off-line path-planning for milling with an industrial robot. The invention aims to extend the operational range of known milling robots. This is achieved with a new software component.

A rotation invariant process requires only 5 degrees of freedom (DOF) for the tool to be specified as any rotation around the tool axis will give the same result. When carrying out the process with an industrial robot with 6 or more DOF, the robot will thus have redundancy. For 6 DOF robots, where the outermost joint is rotational, the tool-axis must be non-coinciding with that axis. A way to give a complete description of the redundancy is to fix the tool and rotating the tool flange of the robot around the tool axis.

In the following X(t) denote the position and orientation of a coordinate system describing the desired tool position and orientation at time t. When specifying X(t), the redundancy due to rotation invariance has not yet been exploited. The redundancy is exploited by an extra parameter $q_{Tool}(t)$ describing the rotation of the tool flange around the tool axis at time t. For chosen X(t) and $q_{Tool}(t)$, the position and orientation of the tool flange of the robot is completely described and the set of inverse kinematics solutions IK(X(t), $q_{Tool}(t)$) is well defined.

A feasible joint trajectory gives an n-tuple $q_{Robot}(t)$ (joint configuration) containing positions of all the joints in the robot as function of time. In order to be feasible, $q_{Robot}(t)$ must at an arbitrary time t belong to IK(X(t),$q_{Tool}$) for some angle $q_{Tool}$. In addition, $q_{Robot}(t)$ must lead the robot to not collide with the environment, the workpiece or the robot itself (self-collision). Furthermore, the joint limits, joint velocity limits and possibly joint acceleration limits must be satisfied at any time.

Existing methods use manually chosen values of $q_{Tool}(t)$. They are mostly fixed to a value Q over the whole process period. The resulting limitation due to the unnecessary small set of inverse kinematics solutions IK(X(t),Q) limits the work space of the robot substantially. It is the main strength of our method that we search for suitable and time-varying $q_{Tool}(t)$'s that can provide a useful IK(X(t), $q_{Tool}(t)$).

At time t, the set of all solutions are thus given by $IK_{all}(t)$ given as the union of IK(X(t),$q_{Tool}$) when $q_{Tool}$ runs from 0 to 360 degrees. The present invention is directed to any method that globally in time searches for feasible paths $q_{Robot}(t)$ using $IK_{all}(t)$ as the set of possible solutions at time t.

In order to describe "globally in time", we for simplicity discretize the time interval of the complete path into $t_1 <= t_2 \ldots <= t_{N-1} <= t_N$. For a given optimization criteria O(qRobot ($t_i$)), a "globally in time" search seeks to find a feasible path qRobot(t) that minimizes the (possibly weighted) sum of all O(qRobot($t_i$))'s. This is opposed to a "look ahead" method, such as that disclosed in US 20051246062A1, where the path is found iteratively from one end and only the next or the next few time steps are considered.

Accordingly, the present invention provides a computer-implemented method for determining feasible joint trajectories for an n-dof (n>5) robot in a rotation invariant processing of an object, such as milling, painting, cutting (e.g. water jet, plasma, and laser), spraying, grinding, drilling, countersinking, and welding, said method comprising the steps:

receiving geometric data representing the object;
    receiving geometric data representing the processing tool;
    receiving a tool path X(t), where t is time;
    searching globally in time for feasible paths $q_{Robot}$(t) using IK (t) and $q_{Tool}$(t) as set of possible solutions at time t, wherein $q_{Robot}$(t) defines positions of all the joints in the robot as function of time, $q_{Tool}$(t) defines the rotation of a tool flange around the tool axis at time t, and IK (t) defines the inverse kinematics solutions for a given X(t) and $q_{Tool}$(t);
    determining, from the geometric data and X(t), how the joint path $q_{Robot}$(t) should be chosen so as to comply with one or more optimisation criteria.

The overall steps of the method can be shown with the following flow diagram in FIG. 1.

Using geometric data of the object and of the robot itself to automatically determine how to relatively orient the object and the robot in the at least one rotational degree of freedom along the interaction path can improve the performance of an operation. Furthermore, as the computer program determines the relative angular orientation along the interaction path, no input or guidance from the user is required.

The method of the present invention can be used to assess the course of motion the robot will take during an actual operation. This assessment can occur prior to an actual operation.

The method can be used to determine a fixed orientation that is an orientation which does not vary along the interaction path, so as to comply with one or more optimisation criteria. Preferably the method comprises determining how to manipulate the relative orientation between the robot and object as they relatively move along the interaction path in order to comply with the one or more optimisation criteria. Accordingly, the method can be used to determine, prior to or during an operation, how to vary relative orientation of the robot and object whilst the robot and object relatively move along an interaction path.

As will be understood, geometric data can comprise dimension data. Geometric data can comprise shape data. Preferably the geometric data comprises three-dimensional ("3D") data. Geometric data can comprise position data. The method can comprise retrieving the geometric data. For instance, the geometric data could be retrieved from a memory device. The geometric data could be obtained from a prior obtained measurement of a reference object. The geometric data could be generated by a user. For instance, the geometric data can be computer-aided design ("CAD") data. For example the geometric data can be a boundary representation of the object. Optionally, the geometric data is a polygonal model of the object. As will be understood, the received geometric data of the object and robot can be combined in a common coordinate frame.

The robot could be a tool for machining the object. For instance, the tool could be a drilling, milling or grinding tool.

As will be understood the interaction path can comprise the path the robot takes during an operation. Specifically, the interaction path could comprise a machining path a tool takes during a machining operation. The interaction path could be one sub-path of a plurality of sub-paths that when executed in sequence describes a whole interaction operation.

The interaction path can comprise the path the robot takes during an operation whilst it is in an interacting relationship relative to the object. The interaction path can comprise the path a tool takes during a machining operation whilst it is machining (e.g. cutting, grinding or milling) the object. Accordingly, the method can comprise determining how to orient the robot whilst interacting with the object. The interaction path can comprise the path the robot takes whilst moving more generally around the object. Accordingly, the interaction path can comprise the path the robot takes between positions in which it is in an interacting relationship relative to the object. As will be understood, the interaction path could be the path on the object that is to be interacted with by the robot. The interaction path is normally the path on the object that is to be machined, e.g. cut and/or milled.

As will be understood if, for example, the interaction path is a fixed path on the object, then it might be necessary to relatively reposition the robot in the at least one linear degree of freedom in order to obtain the determined orientation. Accordingly, determining how the robot and object can be oriented relative to each other can comprise determining the relative position of the robot and object in the at least one linear degree of freedom. The method could comprise obtaining the data representing the interaction path.

The interaction path could be input by the user. Accordingly, the method could comprise receiving an interaction path from a user interface device. The interaction path could be retrieved from a memory device.

The interaction path data could comprise a plurality of points. For instance, an interaction path could comprise a plurality of points on the object which are to be interacted with. For instance, a path could comprise a plurality of points on the object which are to be milled or painted. The points could be discrete points. Optionally the interaction path data could comprise a line, dimension, degree of freedom or the like. For instance, the measurement path data could comprise a line, dimension, degree of freedom or the like along which drilling are to be taken. For instance the interaction path could comprise vector data. Optionally, the interaction path could be defined as a curve between two points.

Suitable optimisation criteria for use with the present invention can include criteria relating to the performance of an interaction operation. Accordingly, the method can comprise determining how the relative orientation of the robot and object can be manipulated during movement of the robot along an interaction path in order to meet one or more performance criteria. Performance criteria can comprise a speed of interaction.

Performance criteria can comprise interaction path length. Performance criteria can comprise predetermined acceleration level. The predetermined acceleration level can relate to the acceleration of the device. The predetermined acceleration level can comprise a maximum acceleration. Performance criteria can comprise the direction of motion. Suitable optimisation criteria for use with the present invention do particularly comprise criteria relating to the boundaries of motion.

The method can comprise for each of a plurality of points along the interaction path determining a plurality of relative orientations between the robot and object to be processed. The method can further comprise for each of a plurality of points along the interaction path selecting collision free orientations only. The method can further comprise selecting from collision free orientations those orientations which comply with one or more other optimisation criteria. The method can comprise determining the cost associated with the movement between a pair of points along the interaction path. The cost could depend on the relative orientation of the robot and object at the pair of points. Accordingly, the method can comprise determining the cost of movement between a pair of points having a first orientation combination. The method can further comprise determining the cost of movement between the same pair of points having a second orientation combination. As will be understood, the orientation combination of a pair of points describes the relative orientation of the robot and object at first and second points along the interaction path.

Preferably, the orientation of the robot at least one of the first and second points is different in the second orientation combination to the first orientation combination. The method can comprise selecting the orientation combination having the lowest cost. This method can comprise determining the cost for a plurality of pairs of points along the interaction path.

The method can comprise selecting those orientations in which the total cost along the interaction path complies with predetermined criteria. The predetermined criteria could be selecting the interaction path having the minimum cost.

As will be understood, the cost of movement can be a value which represents a property of the movement between the two points. For instance the property could be speed. The property could be time. The property could be distance. The property could be acceleration. The cost could be a combination of two or more of the above mentioned properties. Optionally, the cost property could be input by a user.

According to another aspect of the invention there is provided a computer readable medium, bearing computer program code as described above.

According to still another aspect of the invention there is provided a computer comprising: a processor; and a memory, wherein at least one of the processor and memory is adapted to perform the above described method.

DETAILED DESCRIPTION OF THE INVENTION

The aim of the method of the present invention is to make use of the property that the process is invariant with respect to rotation around the tool axis to ease the motion planning and thereby increase the workspace of the robot. Examples of rotation invariant processes are milling, spraying with a circular spray fan, and welding.

In the following the present invention is discussed by way of an actual implementation of the method.

Finding feasible joint trajectories for a n-dof robot with rotation invariant process (n>5), where the process is milling and the system is set up to:
  Input is a file from some CAM software describing the milling tool trajectory
  Actual robot specifications (kinematics and constraints). We have worked with Fanuc R-2000iB, Fanuc LRmate200iB and Kuka KR30ha, which are 6-dof robots.
  Output is a file describing the robot trajectory, the format is made in agreement with the robot supplier.

Figure 1:
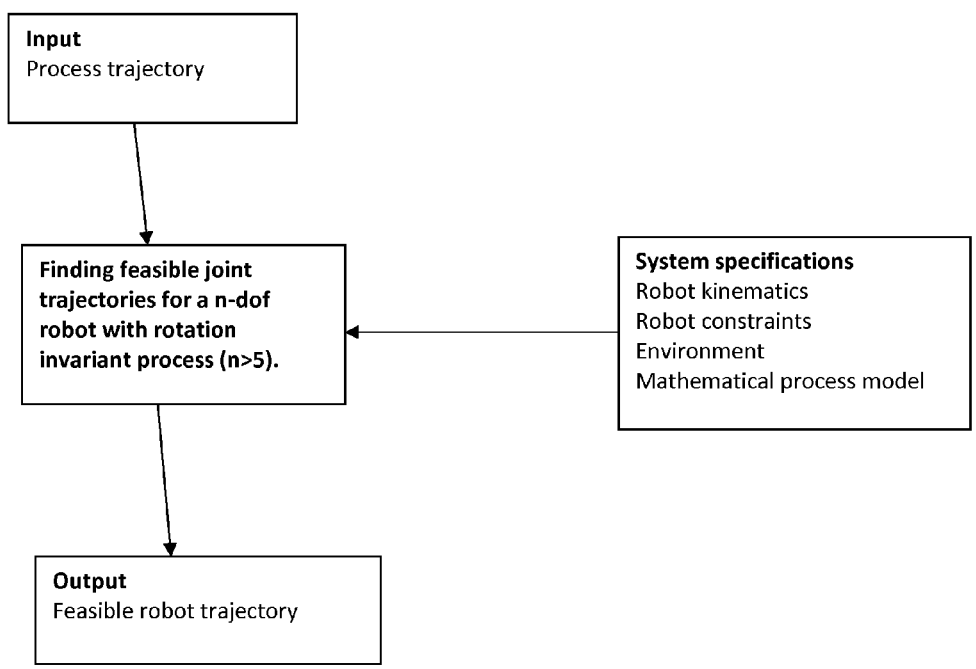
FIG. 1 is a flow diagram according to the present invention.
Figure 2:
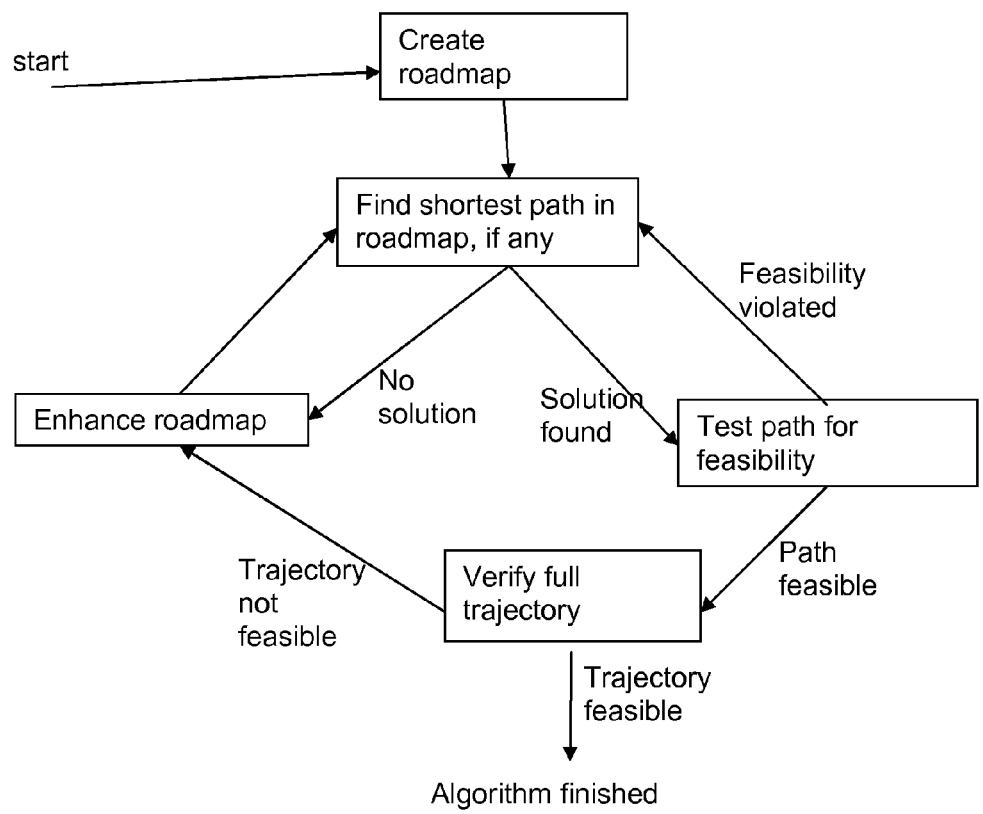
FIG. 2 is an algorithm according to the present invention.

The structure of the algorithm can be described as shown in FIG. 2.

The desired tool trajectory X(t) is represented by discrete tool positions and orientations, $X(t_i)$, i=0, ..., N.

In order to search for suitable $q_{Tool}(t)$'s a roadmap is defined by discrete nodes $q_{Tool}(t_i)$ along the trajectory. Only nodes where $IK(X(t), q_{Tool}(t_i))$ gives a feasible $q_{Robot}(t_i)$ are allowed in the roadmap, these nodes are called feasible. There can at any stage in the algorithm be none, one or several $q_{Tool}(t_i)$'s for each time $t_i$. Initially the roadmap is populated with random nodes $q_{Tool}(t_i)$. Two nodes $q_{Tool}(t_a)$ and $q_{Tool}(t_b)$ are connected with an edge if they are not too far from each other in time ($|t_a-t_b|<t_{max}$) and the change in $q_{Tool}$ is not too big. The weight or cost of an edge is composed of two parts, one based on the change in $q_{Tool}$ and another based on the corresponding joint movements of the robot, where the lowest cost is assigned an edge with a small change in $q_{Tool}$ and small joint movements of the robot.

The roadmap is searched for a shortest path using Dijkstra's algorithm.

Even though all nodes in the roadmap are feasible, the path found must be controlled for feasibility between the nodes of the roadmap. Initially this in only done to some extend to minimize computation time. If feasibility is violated at a specific edge of the roadmap, the edge is deleted and the roadmap is searched again. When a path is feasible it must be verified thoroughly meaning that all points on the process trajectory are controlled for feasibility. If the path isn't feasible for all points or if no solution is found when the roadmap is searched, the roadmap is enhanced with a number of new feasible nodes and the search starts again.

The invention claimed is:

1. A computer-implemented method for determining feasible joint trajectories for an n-dof (n>5) robot in a rotation invariant processing of an object, said method comprising the steps:
  receiving geometric data representing the object;
  receiving geometric data representing the processing tool;
  receiving a tool path X(t), where t is time;
  searching for feasible paths $q_{Robot}(t)$ using IK (t) and $q_{Tool}(t)$ as set of possible solutions at time t, wherein $q_{Robot}(t)$ defines positions of all the joints in the robot as function of time, $q_{Tool}(t)$ defines the rotation of a tool flange around the tool axis at time t, and IK (t) defines the inverse kinematics solutions for a given X(t) and $q_{Tool}(t)$, said $q_{Tool}$ runs from 0 to 360 degrees;
  determining, from the geometric data and X(t), how the joint path $q_{Robot}(t)$ should be chosen so as to comply with one or more optimisation criteria; and
  determining how $q_{Tool}(t)$ can be controlled in order to meet a plurality of the optimisation criteria;
wherein the searching for feasible paths is performed globally in time, discretizing the time interval of the complete path into $t_1<t_2<...<t_{N-1}<t_N$.

2. A method as claimed in claim 1, in which the optimisation criteria comprises collision free movement.

3. A method as claimed in claim 1, in which the optimisation criteria comprises satisfying limitations on joint positions and joint velocities.

4. A method as claimed in claim 1, in which the optimisation criteria comprises other limitations in robot movements.

5. A method as claimed in claim 1 comprising determining for each of a plurality of points along the interaction path a plurality of choices of rotations of the tool flange around the tool axis.

6. A method as claimed in claim 5, comprising selecting only collision free orientations.

7. A method as claimed in claim 1, comprising repeating the steps for a plurality of pairs of points along the interaction path.

8. Computer program code comprising instructions which, when executed by a computer causes the computer to perform the method of claim 1.

9. A computer readable medium, bearing computer program code as claimed in claim 8.

10. A computer comprising: a processor; and a memory, wherein at least one of the processor and memory is adapted to perform the method of claim 1.

11. A method as claimed in claim 1, wherein the processing of an object comprises milling, painting, or welding.

\* \* \* \* \*